(12) United States Patent
Bandini et al.

(10) Patent No.: US 9,233,826 B2
(45) Date of Patent: Jan. 12, 2016

(54) MAGNETICALLY ACTUATED FLOW-RATE SELECTOR

(71) Applicant: SIDEL S.p.A. CON SOCIO UNICO, Parma (IT)

(72) Inventors: Filippo Bandini, Parma (IT); Massimiliano Martini, Parma (IT); Michele Ollari, Parma (IT)

(73) Assignee: SIDEL S.p.A. CON SOCIO UNICO (IT)

( * ) Notice: Subject to any disclaimer, the term of this patent is extended or adjusted under 35 U.S.C. 154(b) by 0 days.

(21) Appl. No.: 14/352,647

(22) PCT Filed: Oct. 18, 2012

(86) PCT No.: PCT/IB2012/055700
§ 371 (c)(1),
(2) Date: Apr. 17, 2014

(87) PCT Pub. No.: WO2013/057694
PCT Pub. Date: Apr. 25, 2013

(65) Prior Publication Data
US 2014/0239209 A1 Aug. 28, 2014

(30) Foreign Application Priority Data
Oct. 18, 2011 (IT) .............................. TO2011A0935

(51) Int. Cl.
| *G05D 7/01* | (2006.01) |
| *B67D 3/00* | (2006.01) |
| *B67C 3/28* | (2006.01) |
| *F16K 3/26* | (2006.01) |
| *F16K 31/08* | (2006.01) |

(52) U.S. Cl.
CPC .............. *B67D 3/0041* (2013.01); *B67C 3/286* (2013.01); *F16K 3/26* (2013.01); *F16K 31/086* (2013.01)

(58) Field of Classification Search
CPC ................... Y10T 137/7792; Y10T 137/7785; Y10T 137/7758; F16K 17/32; F16K 17/30; F16K 17/34; G05D 7/012; G05D 7/0133
USPC ....................................... 138/45, 46; 137/504
See application file for complete search history.

(56) References Cited

U.S. PATENT DOCUMENTS

| 1,531,406 | A | * | 3/1925 | Meunier | ......................... 137/110 |
| 2,307,949 | A | * | 1/1943 | Phillips | ......................... 137/498 |

(Continued)

FOREIGN PATENT DOCUMENTS

| DE | 2246176 | 4/1974 |
| FR | 2952047 | 5/2011 |

OTHER PUBLICATIONS

Corresponding International Search Report and Written Opinion dated Feb. 28, 2013.

*Primary Examiner* — Patrick F Brinson
(74) *Attorney, Agent, or Firm* — The Belles Group, P.C.

(57) ABSTRACT

A flow-rate selector having a main body at least partially defining a duct for feeding a pourable product; a shutter body mobile, within the main body, between a relative downstream stop position, in which the shutter body at least partially engages a segment of the main body defining an outlet of the pourable product, and a relative upstream stop position in which the body leaves the outlet segment free. The shutter body having a tubular body defining internally a duct through which the pourable product can flow and which has a smaller section than the section of the feeding duct.

12 Claims, 6 Drawing Sheets

(56) References Cited

U.S. PATENT DOCUMENTS

| | | | |
|---|---|---|---|
| 3,105,477 A * | 10/1963 | Lowther | 123/574 |
| 3,805,824 A * | 4/1974 | Robbins, Jr. | 137/504 |
| 4,278,010 A * | 7/1981 | Wallischeck et al. | 91/420 |
| 5,081,847 A * | 1/1992 | Anderson, Jr. | 62/222 |
| 5,996,632 A * | 12/1999 | Vogel et al. | 138/31 |
| 6,578,604 B1 | 6/2003 | Adriansens | |
| 7,140,386 B2 * | 11/2006 | Avis et al. | 137/504 |
| 2011/0126920 A1 * | 6/2011 | Rub | 137/485 |

* cited by examiner

US 9,233,826 B2

MAGNETICALLY ACTUATED FLOW-RATE SELECTOR

CROSS-REFERENCE TO RELATED PATENT APPLICATIONS

The present application is a U.S. national stage application under 35 U.S.C. §371 of PCT Application No. PCT/IB2012/055700, filed Oct. 18, 2012, which claims priority to Italian Application No. TO2011A000935, filed Oct. 18, 2011, the entireties of which are incorporated herein by reference.

TECHNICAL FIELD

The present invention relates to a flow-rate selector. In particular, the invention relates to a flow-rate selector for a filling machine and adapted to switch between two different flow-rate values of a flow of a pourable product, such as fruit juice, tea or an energy supplement, with which a container is filled, and which requires to be handled in aseptic conditions.

Furthermore, the invention relates to an a flow-rate regulator and a filling machine.

BACKGROUND ART

Filling machines are known, comprising a filling station fed with empty containers and adapted to provide containers filled with the pourable food product.

The filling station substantially comprises a carousel conveyor rotating about a rotation axis, a tank containing the pourable food product, and a plurality of filling valves which are fluidically connected with the tank and are supported by the carousel conveyor in a radially external position with respect to the rotation axis of the carousel conveyor.

Each flow-rate regulator typically comprises a portion for fastening to the carousel defining therein a filling chamber fluidically connected with the tank, and a filling head arranged along a relative direction parallel to the rotation axis of the carousel.

Each filling head comprises a shutter displaceable in the relative filling chamber, between a closed configuration, in which the shutter prevents the product from reaching the mouth of the relative container to be filled, and an open configuration, in which the chamber and the container mouth are fluidically connected, thus allowing the product to fill the container.

Flow-rate regulators are known comprising a sphere-type shutter, which in its simplest form, comprises a substantially spherical body and has a cylindrical cavity directed along an axis substantially coplanar to the axis along which the fluid flows in a duct and such that, in a totally open configuration, the cylindrical cavity of the shutter is substantially coaxial with the duct. The operation of such flow-rate regulators is based on the possibility of rotating the shutter about an axis substantially orthogonal to that for the flowing of the fluid, whereby the free section of the duct can gradually be reduced, even up to a totally closed configuration.

Furthermore, flow-rate regulators are known comprising a shutter of the so-called butterfly type, which shutter comprises an essentially flat body having a surface substantially coincident with the section of the duct within which the fluid flows. This kind of shutter can rotate about an axis orthogonal to the flow axis of the fluid, so as to substantially vary the free section between a completely open configuration and a completely closed configuration.

Each flow-rate regulator is commonly controllable in response to a detection signal of the level reached by the pourable product within the container. For example, this signal can come from an inductive-type probe which directly detects the level of the pourable product within the container, or a signal processed from an indirect measurement, for example, from the detection of the weight of the container during filling, which is a function only of the level reached in the container, the surface of the section of the container and the density of the pourable product being the same.

To fill a container, the shutter of the flow-rate regulator is displaced from the closed position to an at least partially open position.

As the turbulence within the container increases when the level reached by the pourable product approaches a filling condition, in particular in the case in which the container is a bottle and therefore has a tapering of the section and, in any case, in order to avoid the outflow of pourable product from the container during filling, the filling generally comprises a first high speed step and a second low speed step immediately following the first step. Thereby, the outflow of pourable product from the container is substantially avoided and at the same time the volume of the pourable product introduced in the container is controlled precisely. This volume must in most commercially directed cases correspond within strict limits to the nominal volume indicated on the package which is sold.

The first filling step is ended when the level of pourable food product has reached a predetermined level, for example the level of the probe, or the level corresponding to a predetermined weight of the container.

As an alternative, the reaching of this predetermined level in the container can be detected indirectly by continuously measuring the flow-rate of the fluid fed, for example with a flowmeter, and accordingly computing the overall fed volume.

When the pourable product reaches this level in the container, the second step of filling starts. This low speed filling step lasts a range of time required to fill the container with a predetermined amount of pourable food product.

In the specific case in which the pourable product is added with carbon dioxide, as frequently occurs in the food sector with carbonated beverages, before the step of filling, each container is pressurised in order to be taken to the same pressure of the pourable food product during the filling step. In particular, the pressurisation occurs by feeding a fluid, for example carbon dioxide, within the container while the shutter of the flow-rate regulator is in the closed position. At the end of the filling, each container is depressurised so that the pressure over the free surface of the pourable product equals the atmospheric pressure. This depressurising step is carried out by conveying the carbon dioxide, by which each container was pressurised, outside the container.

Given the above disclosed operation conditions, whether or not the pourable product is added with carbon dioxide, it is necessary that the flow-rate regulator used in this filling machine can take three different configurations: i) a totally closed configuration; ii) a first open configuration (which can possibly overlap with the totally open configuration), corresponding to the fast filling step; and iii) a second open configuration, having a degree of opening smaller than the first open configuration and corresponding to the slow filling step.

In other words, in this kind of filling machine it is necessary to provide a flow-rate regulator adapted to rapidly, precisely, reliably provide the transition between the first and second open configuration. This transition must follow virtually immediately after the pourable product has reached a given threshold level within the container.

The sphere or butterfly shutters disclosed above are theoretically capable of taking any number of positions corresponding to partial opening degrees in the range between the totally closed configuration and the totally open configuration. However, these shutters have a series of disadvantages. In particular, they are difficult to clean given the reduced tolerance between shutter and walls of the duct within which the pourable product flows in use. Furthermore, they imply considerable production costs and, like all mechanical parts rotating or translating reciprocally, are especially wear prone.

It should then be considered that, in order to conveniently manage the operation of a filling machine of the type disclosed, it is essential that the regulator is very rapid in responding to the detection signal of the level reached by the pourable product within the container.

In particular, in order to conveniently switch from the fast filling configuration to the slow filling configuration as previously disclosed, it is recommendable that the regulator comprises an appropriate flow-rate selector adapted to promptly and precisely respond to the detection signal of the level reached by the pourable product within the container.

From this point of view, a sphere or butterfly shutter capable of virtually taking any number of intermediate positions between the open and closed configurations is not convenient from a logic control point of view, since it should, in use, cyclically obtain a rapid rotation about the axis of the shutter, from the first open configuration (possibly totally open) to a predetermined intermediate open position, followed by a just as rapid rotation towards the integrally closed configuration when the desired level of pourable product in the container is reached. It is clear that with these use modes the structure of the shutter is subjected to a considerable mechanical wear and, at the same time, a fine regulation of the controller and of the actuator is necessary as the amplitude of the rotation imposed by the shutter corresponds precisely to a predetermined degree of opening.

The need is therefore felt in the sector to provide a flow-rate selector which is compatible with the specific needs related to the filling of containers with a pourable product in a filling machine of the above disclosed type, in particular in terms of actuation speed in response to a given signal, and therefore of transition from a filling (open) configuration to the other.

Furthermore, the need is felt to provide such a flow-rate selector which allows to limit the production and management costs, in particular as regards the structural complication and the management costs (maintenance, energy consumption, etc.) In particular, the need is felt in the sector to provide such a flow-rate selector adapted to be used with a pourable product which, by its own nature (physical, organoleptic features etc.) needs to be handled in aseptic conditions.

DISCLOSURE OF INVENTION

At least one of the above needs is satisfied by the present invention, as it relates to a flow-rate selector according to claim 1.

Furthermore, the invention provides a flow-rate regulator according to claim 7 and a filling machine according to claim 8.

BRIEF DESCRIPTION OF THE DRAWINGS

A preferred embodiment is hereinafter disclosed for a better understanding of the present invention, by mere way of non-limitative example and with reference to the accompanying drawings, in which.

BEST MODE FOR CARRYING OUT THE INVENTION

Figure 1:
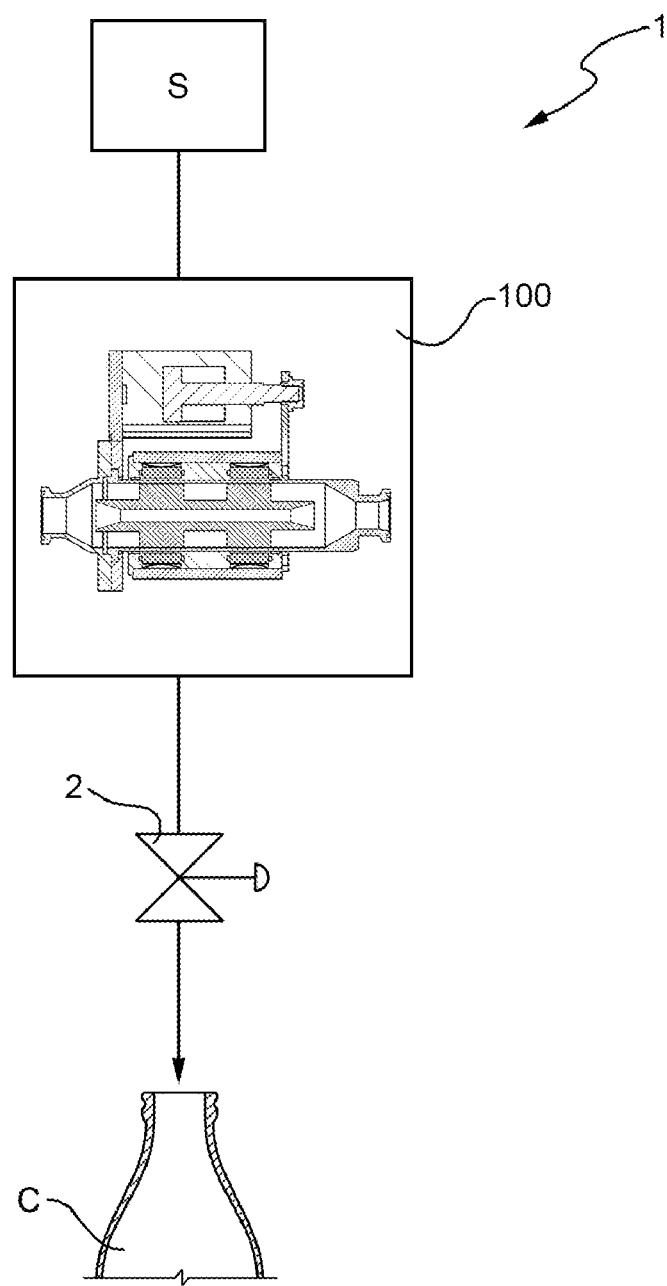
FIG. 1 diagrammatically shows a flow-rate regulator according to the invention.

In FIG. 1 numeral 1 shows as a whole a flow-rate regulator assembly adapted to be incorporated in a filling station (not shown) of a filling machine for filling containers C with a pourable product.

In particular, filling system 1 disclosed herein is suitable for carrying out filling operations which involve fluids containing suspended solid particles.

This filling station is typically fed with empty containers and fills these containers with the pourable product. For this purpose, the filling station typically comprises a tank S containing the pourable product and, where necessary, a source of fluid, for example carbon dioxide, to pressurise containers C before filling; a carousel rotating about a vertical axis and protrudingly carrying a plurality of flow-rate regulator assemblies 1 and of support elements for the respective containers C.

More precisely, flow-rate regulator assemblies 1 are rotated by the carousel and the support elements are displaceable from and towards flow-rate regulator assemblies 1 along respective vertical axes.

In the following description, for simplicity, reference will be made to only one flow-rate regulator assembly and relative container C.

In particular, flow-rate regulator assembly 1 comprises (see FIG. 1) a flow-rate selector 100 selectively and alternatively fluidically connectable with a tank S containing a pourable product to be transferred in a container C.

Furthermore, flow-rate regulator 1 comprises connecting means 2 for fluidically selectively connecting/disconnecting (for example, in an alternated and timed manner) flow-rate selector 100 with container C.

As diagrammatically shown in FIG. 1, selective fluidic connecting means 2 are arranged downstream of the flow-rate selector 100 with respect to a feeding direction of the pourable product from tank S towards relative container C. Thereby, selective fluidic connecting means 2 are actuatable so as to selectively and alternatively take:

a) an absolute closed configuration, in which they completely intercept the flow of pourable product from the flow-rate selector 100 towards container C; and b) a totally open configuration, in which they allow the free flow of the pourable product from flow-rate selector 100 towards container C.

Advantageously, selective fluidic connecting means 2 are configured to provide a jet for filing container C, for example comprise a nozzle-shaped portion that faces, in use, container C.

Preferably, flow-rate regulator assembly 1 is provided with a flowmeter (not shown) arranged for example upstream of flow-rate selector 100.

Flow-rate selector 100 is now disclosed in greater detail referring to the drawings of Figures from 2 to 4.

Flow-rate selector 100 comprises: a main body 101 defining therein a portion 102 of a feeding duct of the pourable product; a shutter body 103 of duct 102.

Furthermore, flow-rate selector 100 advantageously comprises actuating means 104 of shutter body 103, such actuation means 104 being completely external to main body 101.

In greater detail, body 101 extends from a first upstream end 101A to a second downstream end 101B with respect to a feeding direction of the flow of the pourable product. Furthermore, body 101 comprises, between two ends 101A and 101B, a substantially cylindrical tubular segment 105 having axis A, defining therein a cavity 106 having a diameter D1 and fluidically connected upstream to tank S. Cavity 106 partially defines the above said portion 102 of feeding duct.

Furthermore, body 101 defines, at the upstream and downstream ends 101A and 101B, respective inlet and outlet openings 107A and 107B for the pourable product.

In the case shown, body 101 comprises a central portion coinciding with the above disclosed cylindrical segment 105, and two upstream and downstream end portions 108A and 108B extending respectively from central portion 105 to ends 101A and 101B.

Upstream end portion 108A comprises: a tubular segment having a substantially frustoconical internal shape 109A with a smaller diameter D_upstream; and an inlet tubular segment 110A. Inlet opening 107A is defined at the end of inlet tubular segment 110A, opposite to segment 105.

Similarly, the downstream portion 108B comprises a tubular segment having a substantially frustoconical internal shape 109B with a smaller diameter D_downstream; and an outlet tubular segment 110B. Outlet opening 107B is defined at the end of outlet tubular segment 110B, opposite to segment 105.

Figure 2:
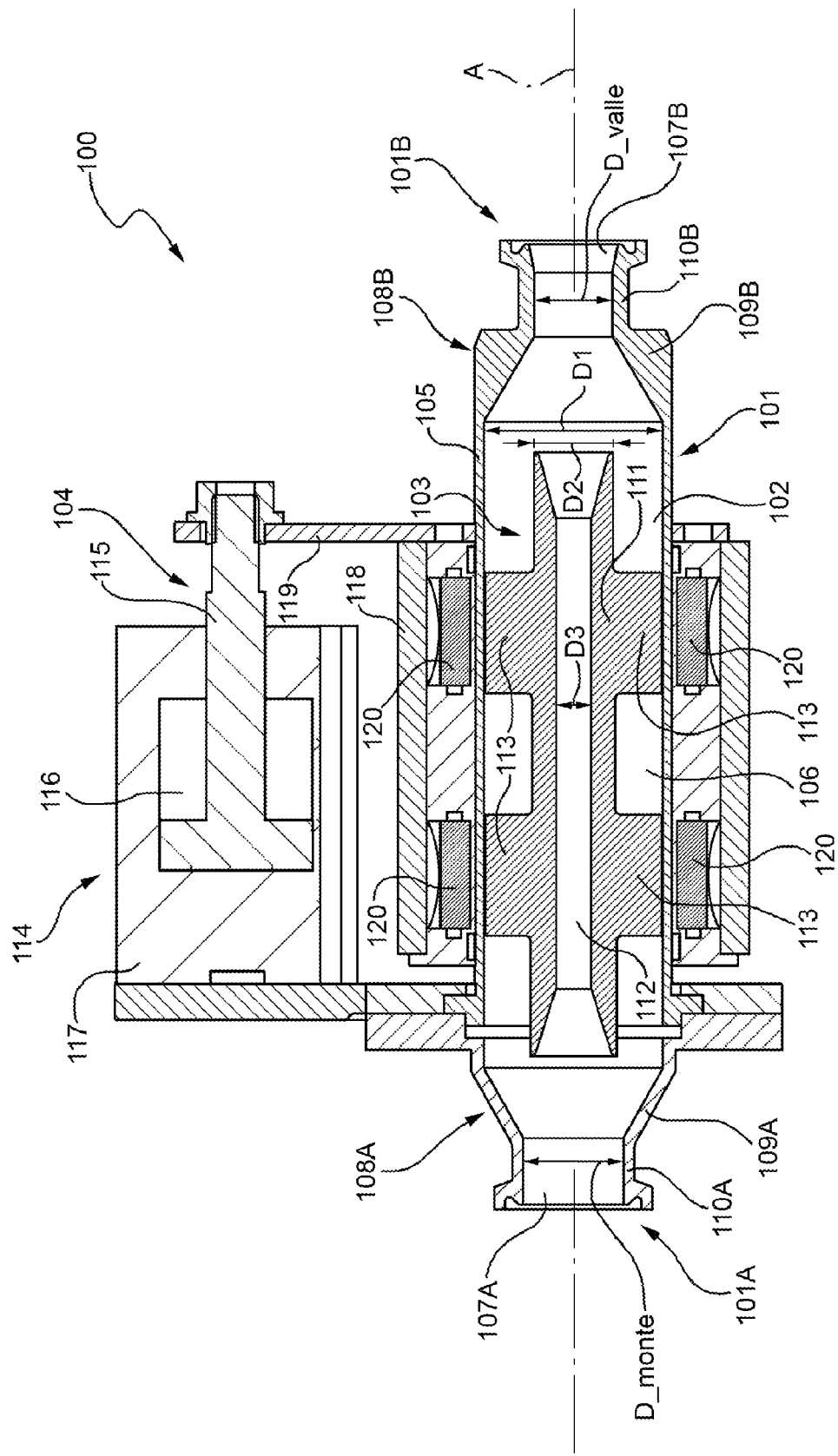
FIG. 2 shows a diagrammatic sectional view of a flow-rate selector according to the invention in a totally open configuration (high speed filling mode)
Figure 3:
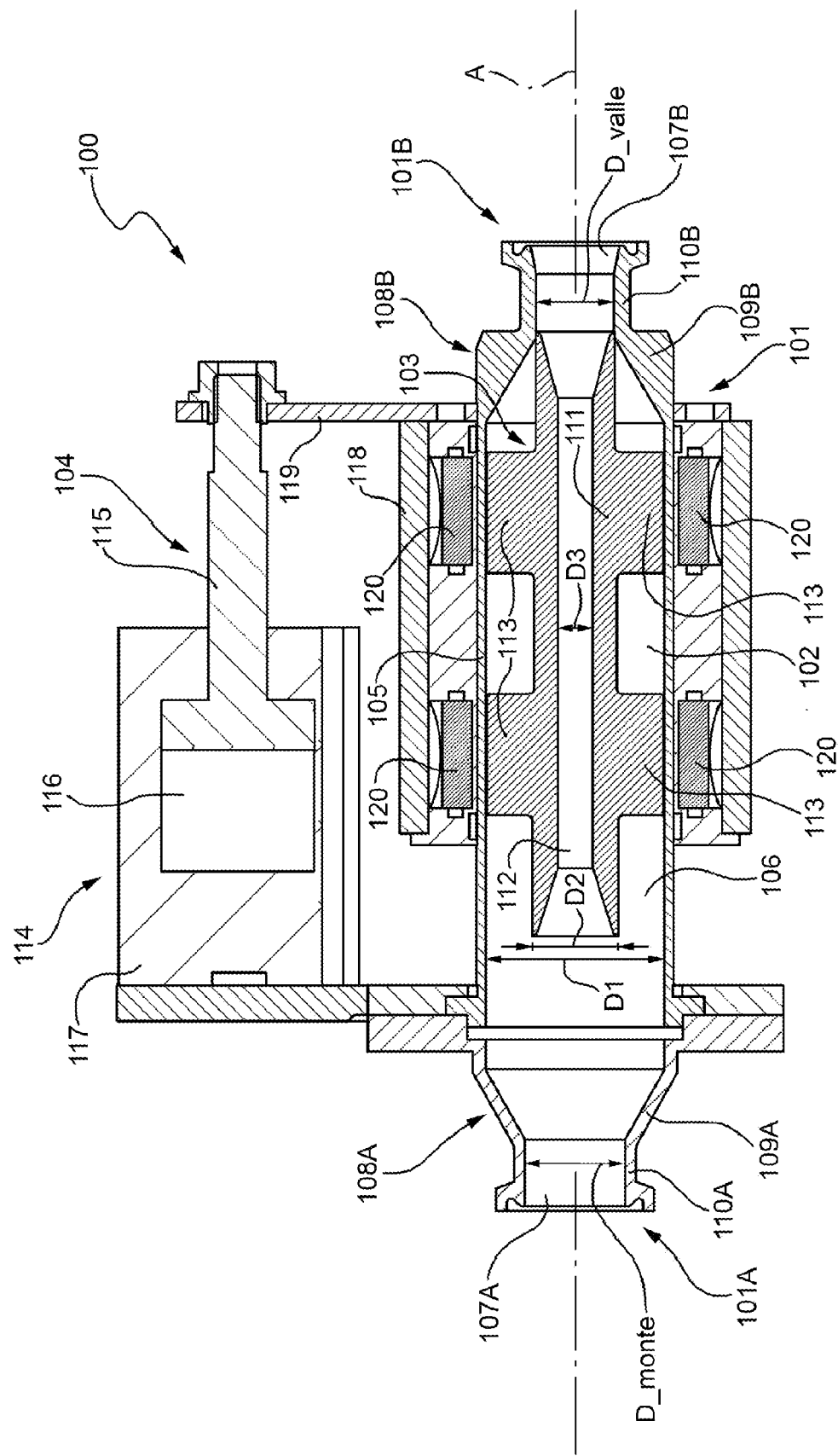
FIG. 3 shows a diagrammatic sectional view of the flow-rate selector of FIG. 2 in a partially open configuration (slow filling mode)
Figure 4:
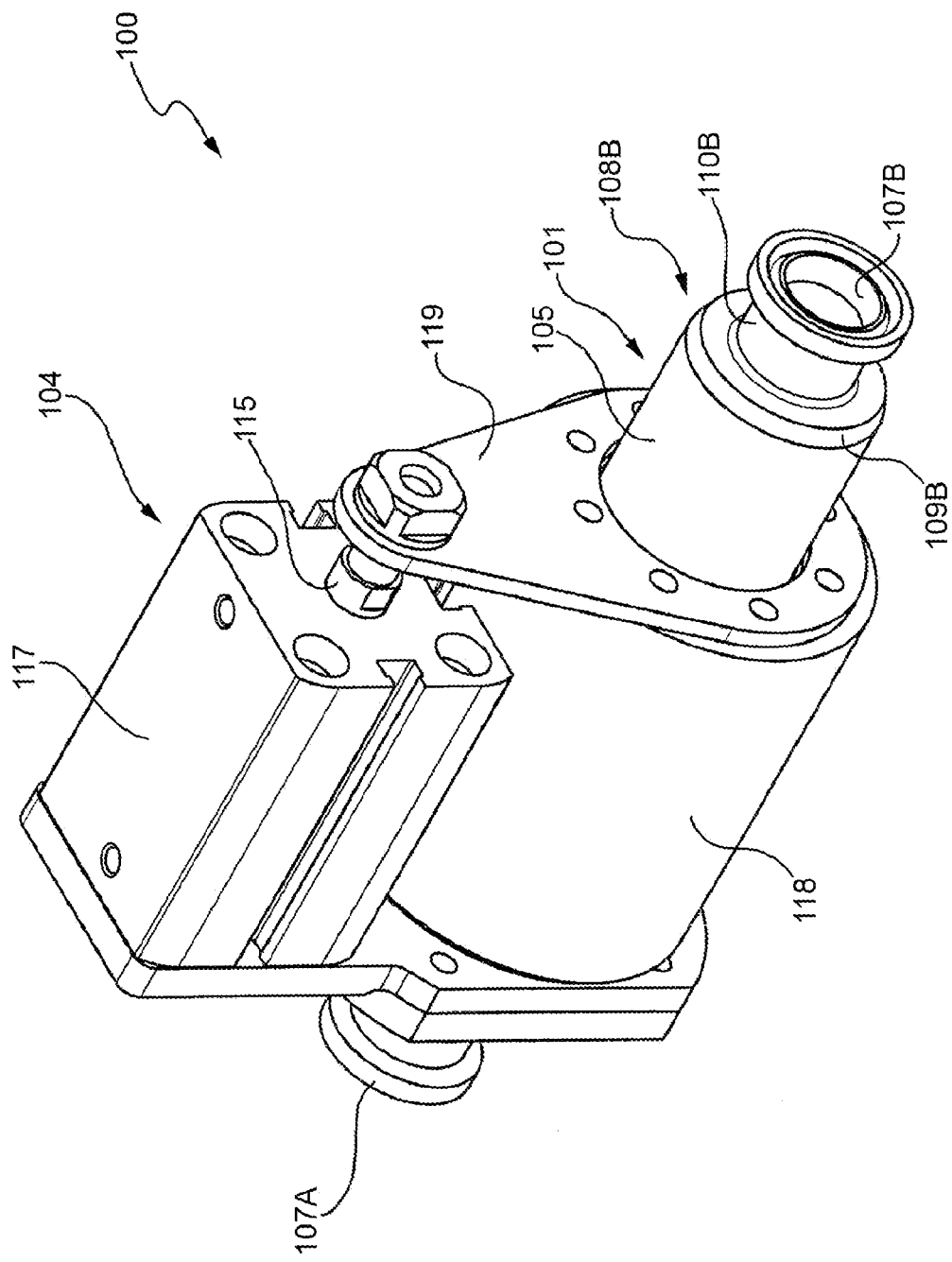
FIG. 4 shows a diagrammatic perspective view of the flow-rate selector of FIGS. 2 and 3 in the totally open configuration (high speed filling mode)

In the case shown in FIGS. 2 and 3, smaller diameter D_downstream of the downstream frustoconical segment 109B is smaller than the smaller diameter D-upstream of the upstream frustoconical segment 109A.

Preferably, the upstream and downstream ends 101A and 101B of body 101 are flanged in order to allow an easy mounting of the flow-rate selector 100 along the feeding line of the pourable product.

Advantageously, shutter body 103 comprises ferromagnetic material. Preferably, shutter body 103 is made of ferromagnetic material. As an alternative, body 103 comprises a ferromagnetic core coated with an external layer, for example a plastic material, which, in use, is directly in contact with the pourable product.

Advantageously, this shutter body 103 comprises:
a stem 111, coaxial with body 101 and extending along axis A by a segment shorter than the overall longitudinal length of cavity 106; and
a plurality of fins 113 which extend radially from the external surface of stem 111 towards the internal wall of main body 101 and which are adapted to provide radial stability to shutter body 103.

Advantageously, stem 111 comprises an open tubular body open at the ends which internally defines a duct 112 through which the pourable product can flow and which is also directed along axis A.

More specifically, the tubular body of stem 111 has an external diameter D2 substantially equivalent to the smaller diameter D_downstream of the downstream frustoconical segment 109B, so as to be adapted to engage the segment of duct 102 defined by outlet tubular segment 110B.

Furthermore, internal duct 112 has a diameter D3 (the internal diameter of stem 111) smaller than smaller diameter D-downstream of downstream frustoconical segment 109B.

In the case shown, stem 111 also comprises two upstream and downstream end portions 111A and 111B having an internal frustoconical shape with an increasing diameter. At these end portions, the diameter of internal duct 112 increases from value D3 of the central tubular body to an end value D2.

Preferably, fins 113 are arranged equally spaced angularly about axis A of stem 111. Preferably, shutter body 103 comprises at least two fins.

In the case shown, the fins extend longitudinally parallel to axis A by an overall length shorter than the overall length of stem 111. Preferably, shutter body 103 comprises first and second fins 113, arranged according to the same angular distribution about axis A. More preferably, first and second fins 113 and 113' occupy relative axial positions symmetrical with respect to the centre of gravity of stem 111.

Shutter body 103 is housed slidingly within cavity 106 of body 101 and is in particular mobile, within cavity 106, between a relative downstream stop position (see FIG. 3) in which stem 111 engages at least partially the segment of duct 102 defined by outlet tubular segment 110B, and a relative upstream stop position (see FIG. 2), in which the stem leaves outlet tubular segment 110B totally free.

Thereby, shutter body 103 is mobile between a partially open configuration of the duct 102 and totally open configuration of duct 102, which correspond from a functional point of view, respectively to a slow filling configuration and a fast filling configuration of container C arranged downstream of flow-rate selector 100.

Shutter body 103 is made of ferromagnetic material.

Figure 5:
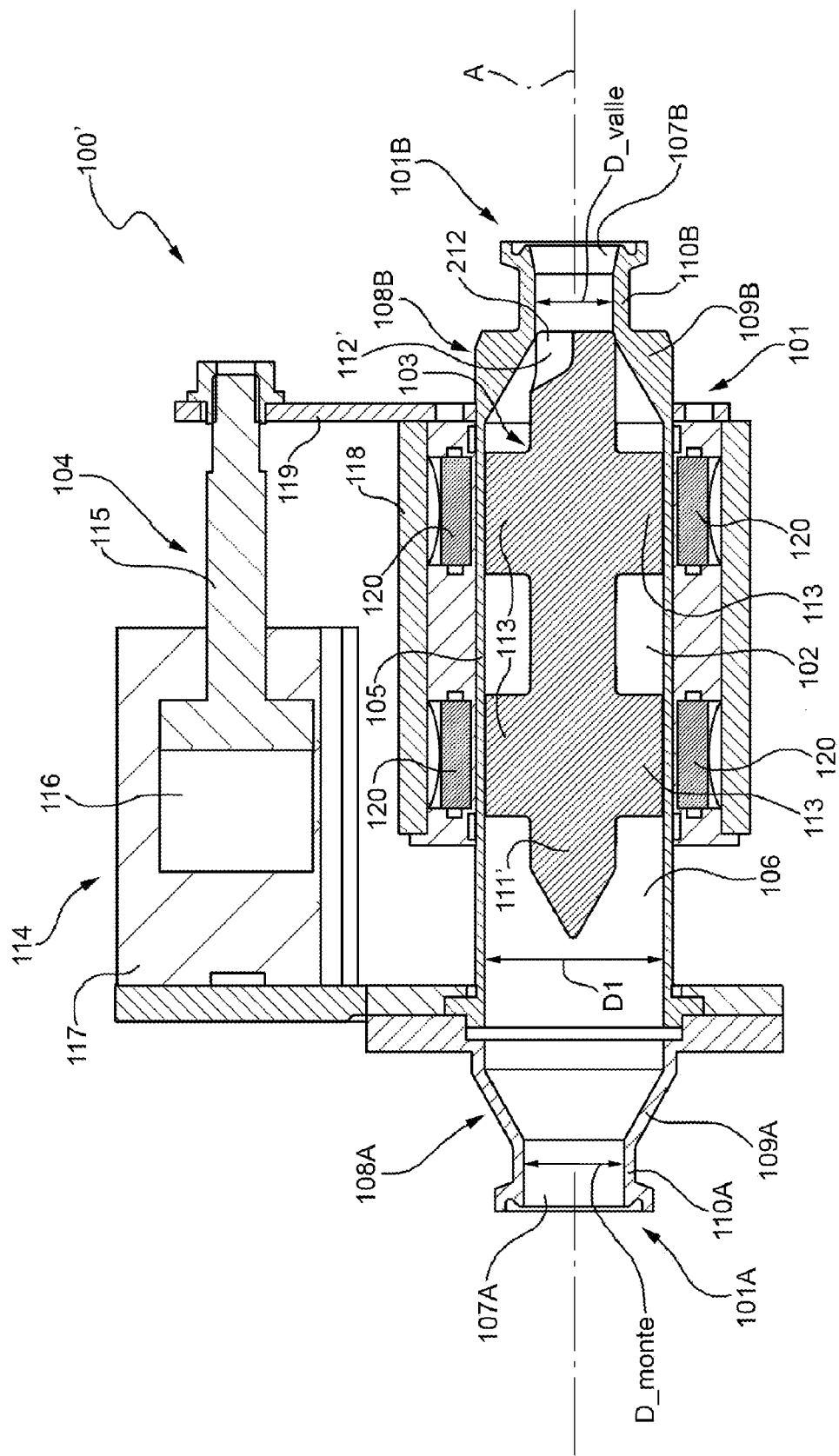
FIGS. 5 and 6 show diagrammatic sectional views of a variant of the flow-rate selector according to the invention, respectively in a partially open configuration (slow speed filling mode) and in a totally open configuration (high speed filling mode).
Figure 6:
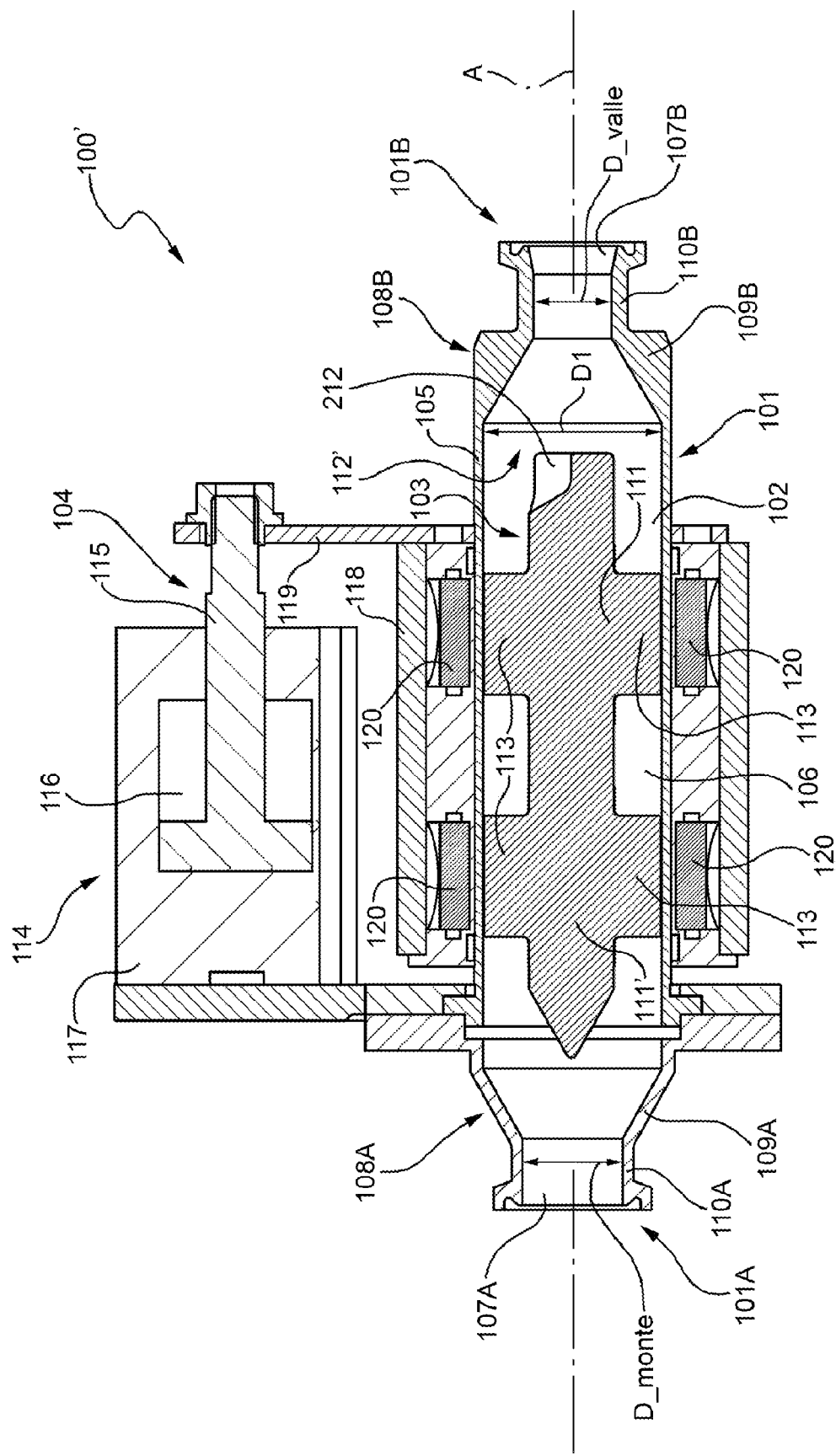

FIGS. 5 and 6 show a variant 100' of the flow-rate regulator according to the invention.

Flow-rate regulator 100' of FIGS. 5 and 6 is similar to flow-rate regulator 100 and is disclosed hereinafter only insofar as it differs therefrom, and using, where possible, the same numerals for identical or corresponding parts.

More specifically, flow-rate regulator 100' differs from flow-rate regulator 100 in that stem 111' of shutter body 103 is not tubular, but full, and has on its surface, at a relative downstream end, a notch 212 which defines, at least partially, a duct 112' through which the pourable product flows and has, in the slow filling configuration, a smaller section than the section of feeding duct 102.

In the case shown, notch 212 has a radial depth substantially equal to the radius of stem 111' and defines together with the internal wall of body 101, duct 112' for the flow of the pourable product in the partially open configuration of duct 102.

Regarding the operation in use, which will be disclosed in greater detail hereinafter, there are no substantial differences between flow-rate regulators 100 and 100'.

However, variant 100' which has just been disclosed has an advantage, with respect to flow-rate regulator 100, in relation to the possibility of solid bodies suspended in the pourable product obstructing the section during the slow filling step. Indeed, while the presence of solid bodies obstructing the internal duct 112 of flow-rate regulator 100 would require in general a maintenance intervention which would imply the disassembly of flow-rate regulator 100, any solid bodies obstructing duct 112' defined at least partially by notch 212 during the slow filling step (FIG. 5) can easily be removed from the notch 212 during the following fast filling step (FIG. 6), a greater flow-rate of pourable product flowing around the stem 111 and, in particular, being introduced between stem 111 and the internal wall of body 101, in particular at notch 212.

Actuating means 104 of shutter body 103 comprise:
a pneumatic actuator 114 comprising a piston 115 sliding within a cavity 116 defined internally by a fixed body 117 with respect to main body 101, piston 115 being mobile between a relative upstream stop position (see FIG. 2) and a downstream stop position (see FIG. 3); and
a tubular body 118 external to, coaxial with and sliding along main body 101.

Furthermore, external tubular body 118 is integrally mobile with piston 115 and is therefore also mobile between the relative upstream stop position (see FIG. 2) and downstream stop position (see FIG. 3).

In the case shown, for this purpose, actuation means 104 comprise a portion 119 for connecting external tubular body 118 to piston 115.

For convenience, portion 119 is releasably fixable to external tubular body 118 to piston 115, in order to ease the maintenance and/or cleaning operations of actuator 114, etc.

Furthermore, external tubular body 118 comprises at least one permanent magnet coupled magnetically with shutter body 103. Preferably, external tubular body 118 is provided with a plurality of permanent magnets 120 which axially extend along relative directions parallel to axis A.

In practice, permanent magnets 120 result arranged in respective positions radially external with respect to main body 101. More in particular, permanent magnets 120 are arranged at a radial distance with respect to axis A such as to exert, through the walls of main body 101, a magnetic attraction on shutter body 103 such as to conveniently draw the latter in a translation motion parallel to axis A.

Preferably, as in the case shown, permanent magnets 120 are equally spaced angularly about axis A and arranged axially facing—except for the presence of the interposed wall of main body 101—fins 113. This reciprocal geometrical distribution of fins 113 and magnets 120 allows the concentration of the magnetic flow at fins 113. This translates in an improved magnetic coupling between external tubular body 118 and shutter body 103.

In virtue of the magnetic coupling between external tubular body 118 and shutter body 103 and of the kinematic link between external tubular body 118 and piston 115, the pneumatic action of actuator 114—i.e. the resulting translation motion of piston 115 within cavity 116 conveniently determines a corresponding axially directed translation of shutter body 103 within main body 101.

For this purpose, flow-rate regulator assembly 1 can also advantageously comprise control means (not shown) adapted to actuate in a structurally independent although functionally associated manner, selective fluidic connecting means 2 and flow-rate selector 100 so as to implement the desired filling procedure.

In use, flow-rate regulator assembly 1 functionally couples selective fluidic connecting means 2 with flow-rate selector 100 of the invention.

Thereby, the actuation of selective fluidic connecting means 2 advantageously allows to rapidly and safely switch between a totally closed configuration of the feeding duct of the pourable product and a delivery configuration of the pourable product.

When selective fluidic connecting means 2 are switched in the delivery configuration, the filling speed of container C is advantageously controlled by the independent actuation of flow-rate selector 100.

In particular, by appropriately controlling actuator 114—for example in response to a predetermined signal which is a function of the degree of filling of container C—flow-rate selector 100 can be rapidly switched between the respective totally open configuration (fast filling, FIG. 2) and partially open configuration (slow filling) and guarantees an aseptic environment in which the pourable product flows.

For example, reaching a given degree of filling of container C can be indirectly detected in an indirect manner by continuously measuring the flow-rate of fluid fed with a flowmeter and accordingly computing the overall volume transferred in container C.

It should be noted that the partially open configuration actually coincides with the configuration in which shutter body 103 at least partially engages the segment of duct 102 defined by outlet tubular segment 110B, i.e. it takes a position which, for a common shutter of a conventional valve, would be a closed configuration.

In particular, by switching selective fluidic connecting means 2 to the delivery configuration and flow-rate selector 100 with shutter body 103 to the totally open configuration (FIG. 2), a fast filling step of container C is started. Thereby, shutter body 103 does not engage in any way outlet tubular segment 110B and the pourable product can flow towards container C at the maximum flow-rate obtainable.

At the end of the fast filling step, i.e. as disclosed previously, when a predetermined level of pourable product is reached in container C, a slow filling step of container C is started by acting on actuation means 103 and accordingly taking shutter body 103 to the partially open configuration (FIG. 3). Thereby, shutter body 103 engages the section defined by outlet tubular segment 110B, however the pourable product is still free to flow within internal duct 112 to shutter body 103. Accordingly, the flow of pourable product is enabled through selector 100 at an intermediate flow-rate compatible with the desired slow filling conditions.

When the slow filling step of container C is completed, i.e. when the predetermined level of pourable product is reached, the flow of pourable product through flow-rate regulator assembly 1 is interrupted by switching selective fluidic connecting means 2 to the totally closed configuration, completely interrupting the fluidic connection between tank S and flow-rate selector.

While selective fluidic connecting means 2 are in the totally closed configuration, by acting on actuating means 104 shutter body 103 is taken back to the totally open configuration (FIG. 2). Thereby, flow-rate regulator assembly 1 is arranged so as to start the filling cycle of a subsequent container C.

From an analysis of the characteristics of flow-rate selector 100 according to the present invention, the advantages it allows to obtain are apparent.

In particular, flow-rate selector 100 allows to fill a container C with a pourable product according to the typical needs of the sector of filling machine, ensuring on one side the desired aseptic conditions and, on the other, very fast response times for switching between the two filling speeds provided by the procedure.

In particular, flow-rate selector 100 allows to promptly and precisely respond to a detection signal of the level reached by the pourable product within container C in order to manage the rapid switching between a fast filling step and a slow filling step.

Furthermore, flow-rate regulator 1 achieves an advantageous functional coupling between selective fluidic connecting means 2 of the type on-Off, typically associated to fast response times, with flow-rate selector 100. By the actuation thereof, which is independent structurally although operatively associated, an advantageous management of the automatic filling operation of a container C can be obtained in full respect of the process specifications and features of the pourable product.

Finally, it is clear that modifications and variants not departing from the scope of protection of the independent claims can be made to the disclosed and shown flow-rate selector and flow-rate regulator.

For example, pneumatic actuator 114 can be conveniently replaced by another type of actuator, as long as capable of determining the translation motion along a direction parallel to axis A of a kinematically coupleable element with external tubular body 118. Furthermore, the magnetic coupling between external tubular body 118 and shutter body 103 can be made by also providing shutter body 103 with at least one portion of magnetic material, arranging the magnetic bodies appropriately coupled.

The invention claimed is:

1. A flow-rate selector comprising:
    a main body at least partially defining a duct for feeding a pourable product;
    a shutter body comprised of a ferromagnetic material, said shutter body being mobile, within said main body, between a relative downstream stop position, in which said shutter body at least partially engages a segment of said main body defining an outlet of said pourable product, and a relative upstream stop position in which said body leaves said outlet segment free;
    means for actuating said shutter body, said actuating means being completely external to said main body and comprising:
        an actuator comprising a piston sliding within a cavity defined internally by a body which is fixed with respect to said main body, said piston being mobile between relative upstream and downstream stop positions; and
        a tubular body external to, coaxial with and sliding along said main body; said tubular body of said actuating means being integrally mobile with said piston and comprising at least one permanent magnet magnetically coupled with said shutter body;
    said shutter body comprises a tubular body defining a duct through which the pourable product can flow and which has a smaller section than the section of said feeding duct.

2. The flow-rate selector of claim 1, wherein said shutter body is slidingly housed within a cylindrical cavity internal to said main body and comprises:
    a stem having a length shorter than the overall longitudinal development of said cavity; and
    a plurality of fins extending radially from the external surface of said stem to the wall defining said internal cavity, said stem comprising a tubular body open at the ends and internally defining said duct.

3. The flow-rate selector according to claim 1, wherein said shutter body is slidingly housed within a cylindrical cavity internal to said main body and comprises:
    a stem having a length shorter than the overall longitudinal development of said cavity; and
    a plurality of fins extending radially from the external surface of said stem to the wall defining said internal cavity, said duct being defined by a notch obtained on said stem at a relative downstream end.

4. The flow rate selector of claim 2, wherein said fins of said plurality of fins are arranged angularly equally spaced about an axis of said stem.

5. The flow-rate selector of claim 2, wherein said tubular body of said actuating means comprises a plurality of permanent magnets angularly equally spaced about the axis of said tubular body of said actuating means and arranged axially facing said fins.

6. A flow-rate selector assembly comprising:
    the flow-rate selector of claim 1; and
    means for fluidically connecting, in a selective manner, said flow-rate selector with a tank containing said pourable product.

7. A filling machine comprising the flow-rate regulator of claim 6.

8. A flow-rate selector comprising:
    a main body at least partially defining a duct for feeding a pourable product;
    a shutter body mobile, within said main body, between a relative downstream stop position, in which said shutter body at least partially engages a segment of said main body defining an outlet of said pourable product, and a relative upstream stop position in which said body leaves said outlet segment free, wherein said shutter body is slidingly housed within a cylindrical cavity internal to said main body;
    said shutter body comprising:
        a tubular body defining a duct through which the pourable product can flow and which has a smaller section than the section of said feeding duct;
        a stem having a length shorter than the overall longitudinal development of said cavity; and
        a plurality of fins extending radially from the external surface of said stem to the wall defining said internal cavity, said duct being defined by a notch obtained on said stem at a relative downstream end.

9. The flow rate selector of claim 8, wherein said fins of said plurality of fins are arranged angularly equally spaced about an axis of said stem.

10. The flow-rate selector of claim 8, comprising means for actuating the shutter body, said actuating means being completely external to said main body.

11. The flow-rate selector of claim 10, wherein said shutter body comprises a ferromagnetic material; said actuation means comprising:
    an actuator comprising a piston sliding within a cavity defined internally by a body which is fixed with respect to said main body, said piston being mobile between relative upstream and downstream stop positions; and
    a tubular body external to, coaxial with and sliding along said main body; said tubular body of said actuation means being integrally mobile with said piston and comprising at least one permanent magnet magnetically coupled with said shutter body.

12. The flow-rate selector of claim 8, wherein said tubular body of said shutter body comprises a plurality of permanent magnets angularly equally spaced about the axis of said tubular body and arranged axially facing said fins.

* * * * *